(12) United States Patent
Yu et al.

(10) Patent No.: US 6,303,691 B1
(45) Date of Patent: *Oct. 16, 2001

(54) IMPACT MODIFICATION OF POLYAMIDES

(75) Inventors: Thomas Chen-chi Yu, Bellaire, TX (US); Kenneth William Powers, Berkeley Heights; Hsien Chang Wang, Edison, both of NJ (US)

(73) Assignee: Exxon Mobil Chemical Patents Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/072,807

(22) Filed: Jun. 7, 1993

Related U.S. Application Data

(62) Division of application No. 07/923,208, filed on Jul. 31, 1992, now abandoned.

(51) Int. Cl.⁷ .............................. C08L 23/16; C08L 23/18
(52) U.S. Cl. .................. 525/178; 525/179; 525/182; 525/183; 525/184; 525/240
(58) Field of Search ................................ 525/178, 179, 525/183, 184, 182, 240

(56) References Cited

U.S. PATENT DOCUMENTS

| | | |
|---|---|---|
| 2,516,741 * | 10/1944 | Young ................................ 162/168.1 |
| 3,835,201 | 9/1974 | Fischer . |
| 4,174,358 | 11/1979 | Epstein . |
| 4,350,794 | 9/1982 | Moncur . |
| 4,548,995 | 10/1985 | Kowalski, et al. . |
| 5,013,793 | 5/1991 | Wang et al. . |
| 5,063,268 * | 11/1991 | Young ................................ 524/286 |
| 5,162,445 | 11/1992 | Powers et al. . |
| 5,187,013 | 2/1993 | Sullivan . |
| 5,238,990 * | 8/1993 | Yu ....................................... 524/504 |
| 5,244,961 | 9/1993 | Yu et al. . |
| 5,369,182 * | 11/1994 | Yu et al. ............................. 525/240 |
| 5,681,899 * | 10/1997 | Wang et al. ........................ 525/232 |
| 6,013,727 * | 1/2000 | Dharmarajan et al. ............... 525/72 |

FOREIGN PATENT DOCUMENTS

| | | |
|---|---|---|
| 31 01 771 A1 | 9/1982 | (DE) . |
| 3101771 * | 9/1982 | (DE) . |
| 0 344 021 A2 | 11/1989 | (EP) . |
| 0 424 351 A2 | 12/1990 | (EP) . |
| 2051 547 A | 8/1988 | (JP) . |
| 2051547 * | 2/1990 | (JP) . |

OTHER PUBLICATIONS

Kirk–Othmer, Encyclopedia of Chemical Technology, v. 10, p. 919 (Date unavailable).
Encyclopedia of Polymer Science and Technology, vol. 10, pp. 392–414 (Date unavailable).

* cited by examiner

*Primary Examiner*—Jeffrey C. Mullis
(74) *Attorney, Agent, or Firm*—John E. Schneider; Myron B. Kurtzman; Kevin M. Faulkner

(57) ABSTRACT

The invention relates to impact modifiers for polyamide compositions which improve the impact strength of the polyamides without adversely affecting the flexural modulus of the composition. The impact modifiers comprise blends of halogenated copolymers of a $C_4$ to $C_7$ isomonoolefin and an alkyl/styrene with a polyolefin.

7 Claims, No Drawings

IMPACT MODIFICATION OF POLYAMIDES

This is a division of application Ser. No. 923,208, filed Jul. 31, 1992 now abandoned.

FIELD OF THE INVENTION

The present invention relates to a novel class of impact modifiers which can improve the impact strength of polyamides with little adverse affect on the flexural modulus of the polyamide.

BACKGROUND OF THE INVENTION

Toughened thermoplastic polyamide compositions are known. See for example, U.S. Pat. No. 4,174,358 which discloses a polyamide matrix and at least one other phase containing particles ranging from 0.01 to 10 microns of at least one specified polymer.

U.S. Pat. No. 4,350,794 discloses a polyamide composition by melt blending of a polyamide resin and a halobutyl composition.

There is still a need to improve the impact strength of polyamide compositions, without substantial loss of the high flexural modulus of the polyamide.

It has now been found that the incorporation of certain polymer blends in polyamide compositions will produce toughened polyamide compositions having improved impact strength without substantial loss of the high flexural modulus of the polyamide.

SUMMARY OF THE INVENTION

In accordance with the present invention there is provided a polymer blend useful as an impact modifier for polyamide compositions comprising:

(a) a halogen-containing copolymer of a $C_4$ to $C_7$ isomonoolefin and a para-alkylstyrene; and (b) a polyolefin component comprising an elastomeric polyolefin, a crystalline polyolefin or mixture thereof.

DETAILED DESCRIPTION OF THE INVENTION

The Copolymer Component

Suitable copolymers of a $C_4$ to $C_7$ isomonoolefin and an alkylstyrene which may be a mono or polyalkylstyrene. For elastomeric copolymer products, the alkylstyrene moiety may range from about 0.5 to about 20 weight percent preferably from about 1 to about 20 weight percent and most preferably about 2 to about 20 weight percent of the copolymer. The preferred copolymers are copolymers of a $C_4$ to $C_7$ isomonoolefin and a para-alkylstyrene.

The copolymers of the isomonoolefin and para-alkylstyrene suitable for use in the present invention include copolymers of isomonoolefin having from 4 to 7 carbon atoms and a para-alkylstyrene, such as described in European patent application 89305395.5 filed on May 26, 1989, (Publication No. 0344021 published Nov. 29, 1989). The copolymers have a substantially homogeneous compositional distribution and include the para-alkylstyrene moiety represented by the formula:

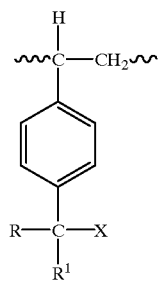

in which X is halogen (preferably bromine) or hydrogen, and in which R and $R^1$ are independently selected from the group consisting hydrogen, alkyl preferably having from 1 to 5 carbon atoms, primary haloalkyl, secondary haloalkyl having from 1 to 5 carbon atoms and mixtures thereof. The preferred isomonoolefin is isobutylene. The preferred para-alkylstyrene comprises para-methylstyrene.

Suitable copolymers of an isomonoolefin and a para-alkylstyrene include copolymers having a number average molecular weight ($M_n$) of at least about 25,000, preferably at least about 30,000, and most preferably about 100,000. The copolymers, preferably, also have a ratio of weight average molecular weight ($M_w$) to number average molecular weight ($M_n$), i.e., $M_w/M_n$ of less than about 6, preferably less than about 4, more preferably less than about 2.5, most preferably less than about 2.0.

The brominated copolymer of the isomonoolefin and para-alkylstyrene obtained by the polymerization conditions now permit one to produce copolymers which comprise the direct reaction product (that is, in their as-polymerized form), and which have unexpectedly homogeneous uniform compositional distributions. Thus by utilizing the polymerization set forth herein, the copolymers suitable for the practice of the invention can be produced. These copolymers, as determined by gel permeation chromatography (GPC) demonstrate narrow molecular weight distributions and substantially homogeneous compositional distributions, or compositional uniformity over the entire range of the compositions thereof. At least about 95 weight percent of the copolymer product has a para-alkylstyrene content within about 10 weight percent, and preferably within about 7 weight percent, of the average para-alkylstyrene content for the overall composition, and preferably at least 97 weight percent of the copolymer product has a para-alkylstyrene content within about 10 weight percent and preferably about 7 weight percent, of the average para-alkylstyrene content for the overall composition. This substantially homogeneous compositionally uniformity thus particularly relates to the intercompositional distribution. That is, with the specified copolymers, as between any selected molecular weight fraction the percentage of para-alkylstyrene therein, or the ratio of para-alkylstyrene to isoolefin, will be substantially the same, in the manner set forth above.

In addition, since the relative reactivity of para-alkylstyrene with isoolefin such as isobutylene is close to one, the intercompositional distribution of these polymers will also be substantially homogeneous. That is, these copolymers are essentially random copolymers, and in any particular polymer chain the para-alkylstyrene to isoolefin, will be essentially randomly distributed throughout that chain.

Suitable halogen-containing copolymers of a $C_4$ to $C_7$ isomonoolefin and a para-alkylstyrene useful in the blends of this invention are the halogenated copolymers corresponding to the previously described iosmonoolefin-alkylstyrene copolymers which may be obtained by halogenating the previously described copolymers. The suitable halogenated copolymers comprise at least 0.5 weight percent of the alkylstyrene moiety. For elastomer copolymer products, the alkylstyrene moiety may contain from about 0.5 to about 20 weight percent, preferably from about 1 to about 20 weight percent, more preferably 2.0 to about 20 weight percent of the copolymer. The halogen content of the copolymer may range from above zero to about 7.5 weight percent, preferably from about 0.1 to about 7.5 weight percent.

The preferred halogen-containing copolymers useful in the practice of this invention have a substantially homogeneous compositional distribution and include the para-alkylstyrene moiety represented by the formula:

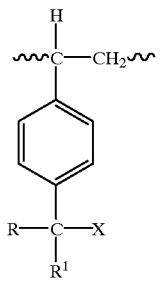

in which R and $R^1$ are independently selected from the group consisting of hydrogen, alkyl preferably having from 1 to 5 carbon atoms, primary haloalkyl, secondary haloalkyl preferably having from 1 to 5 carbon atoms, and mixtures thereof and X is selected from the group consisting of bromine, chlorine and mixtures thereof, such as those disclosed in European patent application 89305395.9 filed May 26, 1989 (Publication No. 0344021 published Nov. 29, 1989). Preferably, the halogen is bromine.

Various methods may be used to produce the copolymers of isomonoolefin and para-alkylstyrene, as described in said European Publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in a polymerization reaction to produce the desired para-alkylstyrene copolymers suitable for use in the present invention. The polymerization temperature may range from about minus 35° C. to about minus 100° C., preferably from about minus 40° C. to about minus 80° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentrations of up to 40 weight percent of polymer are produced.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various hydrocarbon solvents which are particularly advantageous herein, including methylene chloride, chloroform, carbon tetrachloride, methyl chloride, with methyl chloride being particularly preferred.

An important element in producing the copolymer is the exclusion of impurities from the polymerization reactor, namely, impurities which, if present, will result in catalyst poisoning or excessive molecular weight depression by complexing with catalyst or copolymerization with isomonoolefins or the para-alkylstyrene, which in turn will prevent one from producing the para-alkylstyrene copolymer product useful in the practice of the present invention. Most particularly, these impurities include the catalyst poisoning material, moisture and other copolymerizable monomers, such as, for example, meta-alkylstyrenes and the like. These impurities should be kept out of the In producing the suitable copolymers, it is preferred that the para-alkylstyrene be at least 95.0 weight percent pure, more preferably 97.5 weight percent pure, most preferably 99.5 weight percent pure, and that of the isomonoolefin be at least 99.5 percent pure, preferably at least 99.8 weight percent pure and that the diluents employed be at least 99 weight percent pure, more preferably 99.8 weight percent pure.

The most preferred Lewis acid catalysts are ethyl aluminum dichloride and preferably mixtures of ethyl aluminum dichloride with diethyl aluminum chloride. The amount of such catalysts will depend on the desired molecular weight and molecular weight distribution of the copolymer being produced, but will generally range from about 20 ppm to 1 weight percent and preferably from about 0.01 to 0.2 weight percent, based on the total amount of monomer to be polymerized.

Halogenation of the copolymer can be carried out in the bulk phase (e.g., melt phase) or either in solution or in a finely dispersed slurry. Bulk halogenation can be effected in an extruder, or other internal mixer, suitably modified to provide adequate mixing and for handling the halogen and corrosive byproducts of the reaction. The details of such bulk halogenation processes are set forth in U.S. Pat. No. 4,548,995, which is hereby incorporated by reference.

Suitable solvents for solution halogenation include the low boiling hydrocarbons ($C_4$ to $C_7$) and halogenated hydrocarbons. Since the high boiling point of para-methylstyrene makes removal by conventional distillation impractical, and since it is difficult to completely avoid solvent halogenation, it is very important where solution or slurry halogenation is used that the diluent and halogenation conditions be chosen to avoid diluent halogenation, and that residual para-methylstyrene has been reduced to an acceptable level.

With halogenation of para-alkylstyrene/isobutylene copolymers, it is possible to halogenate the ring carbons, but the products are rather inert and of little interest. However, it is possible to introduce the desired halogen functionality into the para-methylstyrene/isobutylene copolymers hereof in high yields and under practical conditions without obtaining excessive polymer breakdown, cross-linking or other undesirable side reactions.

It should be no ted that radical bromination of the enchained para-methylstyryl moiety in the copolymers for the practice of the invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.).

Thus, solutions of the suitable para-methylstyrene/isobutylene copolymers in hydrocarbon solvents such as pentane, hexane or heptane can be selectively brominated using light, heat or selected radical initiators (according to conditions, i.e., a particular radical initiator must be selected which has the appropriate half-life for the particular temperature conditions being utilized, with generally longer half-lives preferred at warmer halogenation temperatures) as promoters of radical halogenation, to yield almost exclusively the desired benzylic bromine functionality, via substitution on the para-methyl group, and without appreciable chain scission and/or cross-linking.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, or with solvent or polymer (i.e., via hydrogen abstraction). The sensitizers referred to are those photochemical sensitizers which will themselves absorb lower energy photons and disassociate, thus causing, in turn, disassociation of the bromine, including materials such as iodine. It is, thus, preferred to utilize an initiator which has a half life of between about 0.5 and 2500 minutes under the desired reaction conditions, more preferably about 10 to 300 minutes. The amount of initiator employed will usually vary between 0.02 and 1.0 weight percent of the copolymer, preferably between about 0.02 and 0.3 weight percent. The preferred initiators are bis azo compounds, such as 2,2-azobis isobutyronitrile (AIBN), azobis (2,4-dimethylvaleronitrile), azobis (2-methylbutryonitrile), and the like. Other radical initiators can be also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as crosslinking. The radical bromination reaction of the copolymers of para-methylstyrene and isobutylene can be highly selective, and almost exclusively produces the desired benzylic bromine functionality. Indeed, the only major side reaction which appears to occur is disubstitution at the para-methyl group, to yield the dibromo derivative, but even this does not occur until more than about 60 percent of the enchained para-methylstyryl moieties have been monosubstituted. Hence, any desired amount of benzylic bromine functionality in the monobromo form can be introduced into the above stated copolymers, up to about 60 mole percent of the para-methylstyrene content.

It is desired that the termination reactions be minimized during bromination, so that long, rapid radical chain reactions occur, and so that many benzylic bromines are introduced for each initiation, with a minimum of side reactions resulting from termination. Hence, system purity is important, and steady-state radical concentrations must be kept low enough to avoid extensive recombination and possible crosslinking. The reaction must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained para-methylstyrene moiety, it is also desirable to neutralize or otherwise remove this HBr during the reaction, or at least during polymer recovery in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished by having a particulate base (which is relatively non-reactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized para-methylstyrene/isobutylene copolymers can be recovered and finished using conventional means with appropriate stabilizers being added to yield highly desirable and versatile functional saturated copolymers.

In summary, halogenation to produce a copolymer useful in the present invention is preferably accomplished by halogenating an isobutylene-para-methylstyrene copolymer using bromine in normal alkane (e.g., hexane or heptane) solution utilizing a bis azo initiator, e.g., AIBN or VAZO® 52 (2,2'-azobis(2,4-dimethylpentane nitrile)), at about 55 to 80° C. for a time period ranging from about 4.5 to about 30 minutes, followed by a caustic quench. The recovered polymer is then washed in basic water wash and water/isopropanol washes, recovered, stabilized and dried.

The Elastomeric Polyolefin

The elastomer component of the present invention can be selected form the group consisting of copolymers of ethylene and a higher alpha olefin and terpolymers of ethylene, a higher alpha olefin and at least one non-conjugated diene.

Suitable copolymers useful in the practice of the invention include random copolymers of ethylene and at least one higher alpha olefin. The term "higher alpha olefin" is used herein to denote an alpha olefin having a higher molecular weight than ethylene. The alpha olefin may be a $C_3$ to $C_{16}$ alpha olefin, such as propylene, 1-butene, 1-pentene, 1-hexene, 1-octene, 1-dodecene, and mixtures thereof. Preferably, the alpha olefin is propylene. The elastomeric monoolefin copolymers useful in this invention may suitably comprise from about 20 to about 90 weight percent ethylene, preferably from about 30 to about 85 weight percent ethylene. The elastomeric monoolefin copolymer will generally have an average molecular weight ($M_w$) in the range of about 10,000 to about 1,000,000 or higher, typically from about 15,000 to about 500,000 and be substantially amorphous. By "substantially amorphous with reference to the monoolefin copolymer is intended herein a degree of crystallinity of less than about 26%, preferably less than about 15%, as measured by conventional test methods. The preferred elastomeric monoolefin copolymer is an ethylene-propylene copolymer rubber, herein designated EPM. Processes for producing such elastomeric monoolefin copolymers are well known and form no part of this invention. EPM elastomers are commercially available.

The terpolymers useful in the practice of the invention include terpolymers of ethylene, at least one higher alpha olefin, and at least one nonconjugated diene. The terpolymer is generally substantially amorphous and can have a substantially random arrangement of at least the ethylene and the higher alpha olefin monomers.

The terpolymer will generally have a weight average molecular weight ($M_w$) in the range between about 10,000 and 1,000,000 or higher, typically between about 15,000 and 500,000, and more typically between about 20,000 and 350,000.

Typically, the terpolymer is "substantially amorphous," and when that term is used to define the terpolymer, it is to be taken to mean that the terpolymer has a degree of crystallinity less than about 25%, preferably less than about 15%, and more preferably less than about 10%, as measured by means well known in the art.

The terpolymer useful in the practice of the invention may comprise from about 20 to 90 weight percent ethylene, preferably about 30 to 85 weight percent ethylene, and even more preferably about 35 to 80 weight percent ethylene.

The higher alpha olefins suitable for use in the preparation of the terpolymer are preferably $C_3$–$C_{16}$ alpha-olefins. Illustrative non-limiting example of such alpha-olefins are propylene, 1-butene, 1-pentene, 1-hexene, 1-octene, and 1-dodecene. The alpha olefin content of the terpolymer is generally from about 10 to about 80 weight percent, preferably from about 20 to about 70 weight percent. The preferred alpha-olefin is propylene.

The non-conjugated diene suitable for use in the preparation of the terpolymer include dienes having from 6 to 15 carbon atoms. Such diene monomers are selected from polymerizable dienes. Representative examples of suitable non-conjugated dienes that may be used to prepare the terpolymer include:

a. Straight chain acyclic dienes such as: 1,4 hexadiene; 1,5-heptadiene; 1,6-octadiene.

b. Branched chain acyclic dienes such as: 5-methyl-1,4-hexadiene; 3,7-dimethyl 1,6-octadiene, and 3,7-dimethyl 1,7-octadiene.

c. Single ring alicyclic dienes such as: 4-vinylcyclohenene; 1-allyl, 4-isopropylidene cyclohexane; 3 allyl-cyclopentene; 4-allyl cyclohexane; and 1-isopropenyl-4-butenyl cyclohexane.

d. Multi ring alicyclic fused and bridged ring dienes such as: dicyclopentadiene; alkenyl, alkylidene, cycloalkenyl and cycloalkylidene norbornenes such as: 5-methylene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene; 5-ethylidene-2-norbornene; and 5-cyclohexylidene-norbornene, etc.

The preferred dienes are selected from the group consisting of 1,4-hexadiene; dicyclopentadiene; 5-ethylidene-2-norbornene; 5-methylene-2-norbornene; and mixtures thereof.

The total diene monomer content in the terpolymer may suitably range from about 0.1 to about 15 weight percent, preferably 0.5 to about 12 weight percent, and most preferably about 1.0 to about 6.0 weight percent.

Preparations of terpolymers of ethylene, a higher alpha olefin and a non-conjugated diene of the type described above are well known in the art and form no part of this invention. The preferred terpolymers for the practice of the invention are terpolymers of ethylene, propylene and a non-conjugated diene (EPDM). Such terpolymers are commercially available.

The Crystallizable Polyolefin

As discussed above, the impact modifier of the invention may also contain a crystallizable polyolefin component. This is particularly true where the impact modifier is to be pelletized before it is blended with the polyamide.

By crystallizable polyolefin is meant one which combines more than 30% crystallinity at ambient temperature as measured by conventional methods, such as X-ray diffraction or thermal analyses. Preferably >50% crystallinity; most preferably >70% crystallinity. Non-limiting example of such polymers include high density polyethylene, polypropylene and ethylene copolymer resin.

The term "ethylene copolymer resin" is used herein to denote copolymers of ethylene and vinyl acetate, copolymers of ethylene and alpha, beta monoethylenically unsaturated monocarboxylic acid, and copolymers of ethylene and an alkyl ester of an alpha, beta monoethylenically unsaturated carboxylic acid.

The term "polypropylene", herein also designated "PP", includes homopolymers of propylene as well as reactor copolymers of polypropylene (RCPP) which may contain from 1 to about 20 weight percent ethylene or an alpha olefin comonomer of 4 to 16 carbon atoms. The polypropylene may be highly crystalline isotactic or syndiotactic polypropylene. The density of the PP or RCPP may range from about 0.80 to about 0.92 g/cc, typically from about 0.89 to about 0.91 g/cc.

The term "High Density Polyethylene" (HDPE) refers to polyethylene polymers having a density of about 0.94 to about 0.97 g/cc. High density polyethylene is commercially available. Typically, HDPE has a relatively broad molecular weight distribution, such that its ratio of weight average molecular weight to number average molecular weight ranges from about 20 to about 40.

As discussed above the impact modifiers are designed to improve the impact strength of polyamide compositions. Thermoplastic polyamide compositions which can be modified by the impact modifiers of the present invention comprise crystalline or resinous, high molecular weight solid polymers including copolymers and terpolymers having recurring polyamide units within the polymer chain. Polyamides may be prepared by polymerization of one or more epsilon lactams such as caprolactam, pyrrolidone, lauryllactam and aminoundecanoic lactam, or amino acid, or by condensation of dibasic acids and diamines. Both fiber forming and molding grade nylons are suitable. Examples of such polyamides are polycaprolactam (nylon-6), polylaurylactam (nylon 12), polyhexamethyl-eneadipamide (nylon 6,6), polyhexamethlene-azelamide (nylon 6,9), polyhexamethylenesebacamide (nylon 6,10), polyhexamethyleneisophthalamide (nylon 6,IP) and the condensation product of 11-aminoundecanoic acid (nylon-11); partially aromatic polyamide made by polycondensation of meta xylene diamine and adipic acid such as the polyamides having the structural formula:

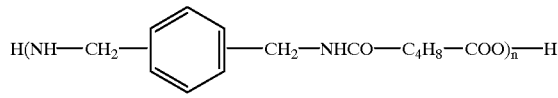

Furthermore, the polyamides may be reinforced, for example, by glass fibers or mineral fillers or mixtures thereof. Pigments, such as carbon black or iron oxide may also be added. Additional examples of polyamides are described in Kirk-Othmer, Encyclopedia of Chemical Technology, v. 10, page 919, and Encyclopedia of Polymer Science and Technology, Vol. 10, pages 392–414. Commercially available thermoplastic polyamides may be advantageously used in the practice of this invention, especially those having a softening point or melting point between 160° to 275°.

Preparation of the Impact Modifier

The impact modifiers of the invention are prepared by blending together the copolymer, elastomer, and an optional polyolefin in a high shear mixer such as a two roll mill, or a banbury mixer to form a masterbatch. In the case where the optional polyolefin was present, high shear mixing needs to be carried out above the melting point of the polyolefin, to flux the polyolefin. Alternatively, the copolymer, elastomer, and optional polyolefin can be used as a dry blend, if subsequent melt blending with polyamide is carried out on a compounder with good mixing provisions.

The modifiers of the invention may comprise between 85 and 32.5 weight percent copolymer and 15 and 65.5 weight percent elastomer, preferably about 75 to 40 weight percent copolymer and 25 to 60 weight percent elastomer, most preferably 65 to 30 weight percent copolymer and 35 to 70 weight percent elastomer. Where an optional polyolefin is employed, the relative amount of the three components may range from 80 to about 32.5 weight percent copolymer, 47.5 to about 20 elastomer and 20 to 5 weight percent polyolefin, preferably 65 to 32.5 weight percent copolymer, 62.5 to 30 weight percent elastomer and 15 to about 5 weight percent polyolefin.

The use of a crystalline polyolefin component is particularly preferred where the impact modifier is to be pelletized. It has been found that the use of certain amount of crystalline polyolefin in the modifier blend either alone or blended with an elastomeric polyolefin allows the modifier to be pelletized without significant loss of impact modification. Pelletization allows for easier handling by the user of the modifier and makes the blending with polyamide easier and more economical. Thus the desired amount of crystalline polyolefin should be sufficient to allow the modifier to be pelletized with out detracting form the performance of the resulting impact modifier.

EXAMPLES

The impact modifiers used in the following examples were prepared by blending together the elastomeric polyolefin, the crystallizable polyolefin or polyolefin blend with the copolymer in a Model 6VF350 6 inch (15.24 cm) two-roll mill. Where the crystallizable polyolefin was present, the rolls were steam heated to about 170° C. to flux the polyolefin.

In the following examples, the styrene content and bromine content of the copolymer used in the blends was varied to demonstrate that the principles of this invention are applicable over a broad set of parameters. Table I below sets forth the composition of the different copolymers used. The tables associated with the examples sets forth which of the copolymers was used for the particular masterbatch.

The abbreviations and/or trademakrs used in the following examples are shown in Table II. The test methods used to measure the properties are shown in Table III.

Example I

A series of masterbatches of the impact modifiers of the invention were prepared for blending with polyamide-6. The first four masterbatches were prepared from blends of the copolymer, elastomer (EPDM, Vistalon® 2505 manufactured by the Exxon Chemical Company) and polyolefin (HDPE, Escorene® HD 6705.39 manufactured by the Exxon Chemical Company) and were designated compositions A, B, C, and D. The ratios of copolymer to elastomer to polyolefin were 32.5/55.0/12.5; 43.75/43.75/12.5; 62.5/25/12.5; and 50/25/25 respectively. The HDPE content of each of these compositions was sufficient to permit the compositions to be pelletized.

In addition to the three component blends, a series of two component masterbatches were prepared. Compositions E and F were prepared by blending the copolymer with EPDM at ratios of 50/50 and 75/25 copolymer to elastomer respectively. A third two component blend, Composition G, was prepared with a 75/25 mixture of copolymer and HDPE blend. Compositions E and F were not pelletizable whereas composition G was.

Each of the masterbatches was then granulated in approximately 3.2 mm by 3.2 mm granules. A small amount of polyamide powder was introduced during the granulation of compositions E and F as a dusting agent to prevent agglomeration. After granulation, the masterbatches were then dried in a dehumidified oven at 140° F. (60° C.) for four hours before compounding. The composition of the masterbatches can be found in Table IV.

Masterbatches A through G were then melt blended in polyamide-6 at a 70/30 polyamide/masterbatch weight ratio with the exception of Masterbatch E with was blended into the polyamide at 75/25 ratio. The melt blending was carried out by first drying pellets of polyamide-6 (PA-6, Capron® 8209F, manufactured by Allied Signal) in a dehumidified oven at 140° F. (60° C.) for four hours. The polyamide and the masterbatches were then melt blended together in a 0.8 inch (20 mm) Welding Engineers counter-rotating twin screw extruder fitted with a strand die at the extruder exit. The extruder strands were then cooled in a water bath before being reduced by a pelletizer into approximately 3.2 mm by 3.2 mm pellets. Before being introduced into the extruder, each masterbatch was pre-dusted with 0.5 weight percent of a grafting agent catalyst, zinc oxide, per hundred part of copolymer. The catalyst helps promote the chemical reaction between the copolymer and the polyamide during compounding. All samples were dried under the same conditions set forth above for at least 4 hours to remove surface moisture prior to molding the samples into various test specimens on a 15 ton Boy injection molding machine.

Table V shows the composition of the various blends prepared in this example.

The blends were then injection molded into various ASTM test specimens for tensile, flexural, and notched Izod impact testings. These specimens were then subjected to a series of tests listed in Table III and the results of the tests are found in table V. In the table, Masterbatches A through G were used to manufacture compositions L through R respectively.

For comparative purposes, a series of specimens were prepared from either polyamide alone, polyamide blended with elastomer or polyolefin alone or polyamide blended with an impact modifier comprising a blend of elastomer and polyolefin.

In Table V, composition H is a specimen prepared from polyamide-6 (Capron® 8209F) alone; Composition I is a 30/70 blend of elastomer (EPDM, Vistalon® 2504) and polyamide-6 (Capron® 8109F); Composition J is a 30/70 blend of polyolefin (HDPE, Escorene® HD 6705.39) and polyamide-6 (Capron® 8209F); and Composition K is a 15/15/70 blend of polyolefin (HDPE, Escorene® HD6705.39), elastomer (EPDM, Vistalon® 2504) and polyamide-6 (Capron® 8209F).

All of the comparative compositions were formed into injection molded specimens and subjected to the test listed in Table III. The results of the tests are recorded in Table V.

As seen in Table V, at room temperature, polyamide-6 has a notched Izod value of 1. As a rule, room temperature notched Izod values of between 10 to 20 are considered superior notched Izod values. The comparative data shows that the use of the elastomer component or polyolefin component, either alone or blended with each other, did not result in a significant improvement in room temperature notched Izod values. The largest value achieved was about 2, whereas impact modifiers of the invention improved the notched Izod value to 18 to 23 at room temperature.

Compositions M, N, O, P, Q and R exhibited excellent notched Izod impact values from room temperature down to about −10° C. At about −20° C., blends having an impact modifier containing about 25 weight percent or more of the crystallizable polyolefin such as compositions O and R, exhibited notched Izod impact values of less than 5.

As can be seen from the data for composition L, the copolymer level is important to ensure good low temperature impact resistance. While composition L with only 32.5% copolymer in the masterbatch shows good room temperature performance, the low temperature value is well below the other higher copolymer containing compositions.

With respect to stiffness, here the level of elastomer appears to be critical. Compositions L, M, N, O, Q and R all show excellent stiffness retention in that all blends show more than 200,000 psi (1379 MPa) in flexural modulus. Composition P, however, did show some degradation in stiffness in that it exhibited a flexural modulus of only 155,000 psi (1069 MPa). This deficit may be remedied by the addition of polyolefin to the impact modifier. As seen in Composition L which contains a greater amount of elastomer than Composition P, the flexural modulus is still greater than 200,000 psi (1379 MPa). This appears to be due to the presence of HDPE which tends to enhance stiffness.

Composition S in Table V, is a specimen made from a 30/70 blend of copolymer and polyamide-6 (Capron® 8209F). Comparison of the data for Composition S with that for Compositions N and Q reveals that it is possible to replace a substantial portion of the more expensive copolymer with a blend of relatively inexpensive HDPE and EPDM and maintain the same notched impact strength and stiffness. Moreover, the presence of HDPE permits the impact modifier to be pelletized which makes handling and processing the impact modifiers easier and less costly.

Example II

In Table V, a second series of masterbatches were prepared for blending with polyamide-6,6. Two of these master batches, composition T and U, were two component blends of the copolymer and elastomer (EPDM, Vistalon® 2504). The copolymer/elastomer ratios for the blends were 50/50 and 40/60 respectively. The compositions were not pelletizable.

In addition, two, three component master batches were prepared, compositions V and W. They were comprised of copolymer, elastomer (Vistalon® 2504) and polyolefin (Escorene® HD 6705.39) in ratios of 43.3/36.7/20 and 40/50/10 respectively. These compositions were pelletizable.

These masterbatches were granulated and dried in the manner described above and were then melt blended with polyamide-6,6 (Zytel® 101, manufactured by E.I. duPont de Nemours and Company) in a manner similar to that used to melt blend the impact modifiers of the invention with polyamide-6 above. Before being introduced into the cylinder, each masterbatch was predusted with 0.5 weight percent of a grafting catalyst, magnesium oxide, per hundred part of copolymer. The resulting compositions are listed in Table VII as compositions AB, AC, AD and AE. The blends were also used to prepare test specimens as described above and were subjected to the tests listed in Table III. The results of the tests can be seen in Table VII.

Comparative specimens containing polyamide-6,6 were also prepared. In Table VII, Composition X is a specimen prepared from polyamide 6,6 (Zytel® 101) alone; Composition Y is a 30/70 blend of elastomer (EPDM, Vistalon® 2504) and polyamide 6,6 (Zytel® 101); Composition Z is a 30/70 blend of polyolefin (HDPE, Escorene® HD 6705.39) and polyamide 6,6 (Zytel® 101); and Composition AA is a 15/15/70 blend of elastomer (EPDM, Vistalon® 2504), polyolefin (HDPE Escorene® 6705.39) and polyamide 6,6 (Zytel® 101).

Finally, a composition was prepared using the copolymer alone as an impact modifier for a polyamide composition. Composition AF in Table VII is a 30/70 blend of copolymer with polyamide 6,6 (Zytel® 101).

All of the comparative compositions were formed into specimens and subjected to the tests listed in Table III. The results of the tests are recorded in Table VII.

Compositions AB, AC, AD, and AE (all the copolymer containing compositions) showed excellent room temperature notched Izod impact values and acceptable values down to about −20° C. Even at about −20° C., all blends showed a useful 3.5 to 4 notched Izod impact strength. The compositions also showed excellent stiffness retention with all compositions showing a flexural modulus of greater than 200,000 psi (1379 MPa).

A comparison of the data for Composition AF with that from Compositions AD and AE reveals that it is possible to replace a portion of the more costly copolymer with a combination of relatively lower costing EPDM and HDPE while still maintaining the improved impact strength and stiffness. Moreover, as stated earlier, the presence of HDPE allows the impact modifier to be pelletized.

Example III

Two dry blends were prepared for direct letdown into the polyamide resins. They are shown as compositions AG and AH. The blend ratio for both compositions are 62.5/25/12.5 copolymer/elastomer/polyolefin. Composition AG was melt blended with polyamide 6,6 (Zytel® 101), whereas composition AH was melt blended with polyamide 6 (Capron® 8207F). The resulting compositions are listed as compositions AJ and AI in Table VIII. These two blends, upon proper drying to remove surface water were also used to prepare ASTM test specimens as described above and were subject notched Izod impact testing in Table III. The result of the tests can be seen in Table III. Again excellent room temperature and low temperature impact were obtained as compared with unmodified polyamides.

TABLE I

Brominated Isobutylene Paramethylstyrene Copolymer Used

| Polymer | Wt. %[a] Bromine | Mole % PMS | Mole %[b] Brominated PMS | $M_v$[c] |
|---|---|---|---|---|
| Copolymer A | 0.72 | 1.9 | 0.4 | 460,000 |
| Copolymer B | 1.3 | 2.45 | 0.8 | 400,000 |
| Copolymer C | 1.0 | 1.9 | 0.6 | 460,000 |
| Copolymer D | 0.5 | 2.0 | 0.3 | 460,000 |
| Copolymer E | 0.82 | 2.3 | 0.5 | 460,000 |

Notes
[a]Total bromine on polymer by x-ray fluoresence.
[b]Mole % brominated paramethylstyrene (PMS) units by Nuclear Magnetic Resonance (NMR).
[c]Viscosity average molecular weight by dilute solution (DSV) in disobutylene at 68° F. (20° C.).

TABLE II

ABBREVIATIONS AND TRADEMARKS

| INGREDIENT | DESCRIPTION |
|---|---|
| Capron ® 8209F Allied Signal | Polyamide 6 (PA-6) |
| Capron ® 8207F Allied Signal | Polyamide 6 (PA-6) |
| Zytel ® 101 E. I. DuPont | Polyamide 6.6 (PA-6,6) |
| Br-XP-50 Exxon Chemical | Brominated Isobutylene para-methylstyrene copolymer |
| Irganox ® B-215 Ciba Geigy | 33/67 Blend of Irganox 1010 and Irgafos 168 |
| Irganox ® 1010 Ciba Geigy | Tetrakis (methylene (3,5-di-tert-butyl-4-hydroxy-hydrocinnamate) methane |
| Irgafos ® 168 Ciba Geigy | Tris (2,4-di-tert-butyl-phenyl) phosphate |
| Protox ® 169 New Jersey Zinc Co. | Zinc Oxide |
| Maglite ® D C. P. Hall | Magnesium oxide |
| Vistalon ® 2504 Exxon Chemical | Diene modified ethylene propylene terpolymer |
| Escorene ® HD 6705.39 Exxon Chemical | High Density Polyethylene |

TABLE III

TEST METHOD

| Test | Test Method |
|---|---|
| Tensile Strength psi | ASTM D-638 |
| Elongation % | ASTM D-638 |
| Flexural Modulus psi | ASTM D-790 |
| Notched Izod Impact ft-lb/in | ASTM D-256 |

TABLE IV

Br XP 50/EPDM/HDPE MASTERBATCHES

| | A | B | C | D | E | F | G |
|---|---|---|---|---|---|---|---|
| Copolymer A | | | 62.5 | 50 | | 75 | 75 |
| Copolymer B | 32.5 | 43.75 | | | 50 | | |
| Vistalon 2504 | 55 | 43.75 | 25 | 25 | 50 | 25 | |
| Escorene HD6705.39 | 12.5 | 12.5 | 12.5 | 25 | | | 25 |
| Irganox B-215 | 0.1 | 0.1 | 0.1 | 0.1 | 0.1 | 0.1 | 0.1 |

TABLE V

MASTERBATCH/POLYAMIDE-6 BLENDS - (DRY AS MOLDED PROPERTIES)

| Composition | H | I | J | K | L | M | N | O | P | Q | R | S |
|---|---|---|---|---|---|---|---|---|---|---|---|---|
| Capron 7209F | 100 | 70 | 70 | 70 | 70 | 70 | 70 | 70 | 75 | 70 | 70 | 70 |
| Vistalon 2504 | | 30 | | 15 | | | | | | | | |
| Escorene HD 6705 39 | | | 30 | 15 | | | | | | | | |
| Copolymer C | | | | | | | | | | | | 30 |
| Composition A* | | | | | 30 | | | | | | | |
| Composition B** | | | | | | 30 | | | | | | |
| Composition C*** | | | | | | | 30 | | | | | |
| Composition D# | | | | | | | | 30 | | | | |
| Composition E# | | | | | | | | | 25 | | | |
| Composition F## | | | | | | | | | | 30 | | |
| Composition G## | | | | | | | | | | | 30 | |
| Irganox B-215 | 0.1 | 0.1 | 0.1 | 0.1 | 0.1 | 0.1 | 0.1 | 0.1 | 0.1 | 0.1 | 0.1 | 0.1 |
| Property | | | | | | | | | | | | |
| Tensile at Yield, Kpsi | 10.6 | | | | 5.1 | 5.4 | 5.1 | 5.3 | 5.9 | 5.1 | 5.3 | 5.7 |
| Tensile at Break, Kpsi | 8.5 | | | | 5.5 | 6.8 | 5.9 | 5.5 | 5.4 | 5 | 6.2 | 6.3 |
| Elongation at Yield, % | 9 | | | | 9 | 9 | 9 | 9 | 9 | 9 | 9 | 7.3 |
| Elongation at Break, % | 120 | | | | 221 | 345 | 150 | 200 | 109 | 320 | 240 | 200 |
| Flexural Modulus, Kpsi | 385 | 239 | 284 | 239 | 218 | 202 | 199 | 221 | 155 | 205 | 219 | 255 |
| 1/8" Notched Izod ft-lb/in | | | | | | | | | | | | |
| 23° C. | 1 | 2 | 1.3 | 1.7 | 18.5 | 20.5 | 22.1 | 22.3 | 19.5 | 22.2 | 23.3 | 22 9 |
| 0° C. | 0.4 | | | | 3.9 | 18.7 | 21.7 | 21.1 | 14.7 | 21.3 | 20.3 | 24.3 |
| −10° C. | 0.4 | 1.5 | 1 | 1.3 | 3.1 | 11.8 | 19.1 | 18 | 11.2 | 19.8 | 16.8 | 21.7 |
| −20° C. | 0.7 | | | | 2.5 | 3.3 | 13.9 | 4.3 | 2.7 | 16.8 | 2.6 | 17.2 |

\*Dusted Composition A with 0.14 wt. % Protox 169
\*\*Dusted Composition B with 0.22 wt. % Protox 169
\*\*\*Dusted Composition C with 0.31 wt. % Protox 169
Dusted Composition D and E with 0.25 wt. % Protox 169
Dusted Compositions F and G with 0.3.75 wt. Protox 169
^ Dusted Composition C with 0.5 wt. % Protox\ 169

TABLE VI

Br XP-50/EPDM/HDPE MASTERBATCHES

|  | T | U | V | W |
|---|---|---|---|---|
| Copolymer A | 50 | 60 | 43.3 | 40 |
| Vistalon ® 2504 | 50 | 40 | 36.7 | 50 |
| Escorene ® HD6705.39 |  |  | 20 | 10 |
| Irganox ® B-215 | 0.1 | 0.1 | 0.1 | 0.1 |

TABLE VII

MASTERBATCH/POLYAMIDE 6.6 BLENDS -
(Dry As Molded Properties)

| Composition | X | Y | Z | AA | AB | AC | AD | AE | AF |
|---|---|---|---|---|---|---|---|---|---|
| Zytel 101 | 100 | 70 | 70 | 70 | 70 | 70 | 70 | 70 | 70 |
| Vistalon 2504 |  | 30 |  | 15 |  |  |  |  |  |
| Escorene HD 6705.39 |  |  | 30 | 15 |  |  |  |  |  |
| Copolymer D |  |  |  |  |  |  |  |  | 30 |
| Composition I* |  |  |  |  | 30 |  |  |  |  |
| Composition U** |  |  |  |  |  | 30 |  |  |  |
| Composition V*** |  |  |  |  |  |  | 30 |  |  |
| Composition W# |  |  |  |  |  |  |  | 30 |  |
| Irganox B-215 | 0.1 | 0.1 | 0.1 | 0.1 | 0.1 | 0.1 | 0.1 | 0.1 | 0.1 |
| Property |  |  |  |  |  |  |  |  |  |
| Tensile at Yield, Kpsi | 12 |  |  |  | 6 | 5.7 | 5.5 | 5.4 |  |
| Tensile at Break, Kpsi | 12 | 6.6 | 8.8 | 8.2 | 6 | 5.8 | 5.5 | 5.5 |  |
| Elongation at Yield, % | 5 |  |  |  | 8 | 7 | 7 | 7 |  |
| Elongation at Break, % | 60 | 12 | 10 | 11 | 28 | 31 | 32 | 26 |  |
| Flexural Modulus, Kpsi | 420 | 258 | 314 | 292 | 225 | 212 | 214 | 207 | 254 |
| 1/8" Notched Izod |  |  |  |  |  |  |  |  |  |
| ft-lb/in |  |  |  |  |  |  |  |  |  |
| 23° C. | 1 | 0.8 | 0.7 | 1 | 16.3 | 16.8 | 16.4 | 15.8 | 20.1 |
| 0° C |  | 0.8 | 0.7 | 0.8 | 13 | 10.9 | 14 | 14.5 | 7.9 |
| −10° C. |  | 0.7 | 0.7 | 0.8 | 5.3 | 4.7 | 6.5 | 6 | 5.8 |
| −20° C. |  | 0.5 | 0.4 | 0.5 | 2.8 | 4 | 4 | 3.5 | 4.1 |

*Dusted Composition T with 0.25 wt. % Maglite D
**Dusted Composition U with 0.30 wt. % Maglite D
***Dusted Composition V with 0.22 wt. % Maglite D
Dusted Compositions W and E with 0.20 wt. % Maglite D
^Dusted Copolymer D with 0.5 wt. % Maglite D

TABLE VIII

DRY BLEND/POLYAMIDE BLENDS
(DRY AS MOLDED PROPERTIES)

| Composition | AG | AH | AI | AJ |
|---|---|---|---|---|
| Capron ® 8307F |  |  | 70 |  |
| Zytel ® 101 |  |  |  | 70 |
| Copolymer D | 62.5 |  |  |  |
| Copolymer E |  | 62.5 |  |  |
| Vistalon ® 2504 | 25 | 25 |  |  |
| Escorene ® HD 6705.39 | 12.5 | 12.5 |  |  |
| Composition AG |  |  |  | 30 |
| Composition AH |  |  | 30 |  |
| Irganox ® B-215 |  |  | 0.1 | 0.1 |
| 1/8" Notched Izod |  |  |  |  |
| ft-lb/in. |  |  |  |  |
| 23° C. |  |  | 20.4 | 18 |
| 0° C. |  |  | 20 | 8.6 |
| −10° C. |  |  | 19.9 | 4.1 |
| −20° C. |  |  | 15.9 | 3.1 |

What we claim is:

1. A polyamide composition having improved impact resistance comprising:
   (a) a polyamide; and
   (b) an impact modifier comprising:
      (i) a halogenated copolymer consisting of a $C_4$ to $C_7$ isomonoolefin and an alkylstyrene; and
      (ii) a polyolefin component comprising a blend of ethylene-propylenediene rubber and high density polyethylene.

2. The polyamide composition defined in claim 1 wherein said polyamide is selected from nylon 6 and nylon 6,6.

3. The polyamide composition defined in claim 1 wherein said isomonoolefin is isobutylene.

4. The polyamide composition defined in claim 1 wherein said alkylstyrene is para-methylstyrene.

5. The polyamide composition defined in claim 1 wherein said polyolefin component is selected from the group consisting of ethylene-propylene rubber, ethylene-propylene-diene rubber, polyethylene and blends thereof.

6. The polyamide composition defined in claim 1 wherein said halogenated copolymer and said polyolefin component are dry blended.

7. The polyamide composition defined in claim 1 wherein said polyamide and said halogenated copolymer and said polyolefin component are melt blended.

* * * * *